US012612018B2

(12) United States Patent
Goodarzi et al.

(10) Patent No.: US 12,612,018 B2
(45) Date of Patent: Apr. 28, 2026

(54) METHODS AND SYSTEMS FOR EVALUATING TRAILER BRAKING SYSTEM PERFORMANCE AND CONDITIONS

(71) Applicant: GM GLOBAL TECHNOLOGY OPERATIONS LLC, Detroit, MI (US)

(72) Inventors: Avesta Goodarzi, Whitby (CA); Benjamin J. Eles, Goodrich, MI (US); Todd J. Brinkman, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/662,998

(22) Filed: May 13, 2024

(65) Prior Publication Data

US 2025/0346216 A1      Nov. 13, 2025

(51) Int. Cl.
*B60T 8/17* (2006.01)
*B60T 8/172* (2006.01)

(52) U.S. Cl.
CPC ............ *B60T 8/1708* (2013.01); *B60T 8/172* (2013.01)

(58) Field of Classification Search
CPC .......... B60T 8/17; B60T 8/1708; B60T 8/172; B60T 17/22; B60T 7/08; B60T 7/16; B60T 7/20; B60T 2230/00; B60T 2240/00; B60T 2250/00; B60P 3/70
USPC ................................................. 701/48, 70–92
See application file for complete search history.

(56) References Cited

U.S. PATENT DOCUMENTS

| | | | | |
|---|---|---|---|---|
| 2006/0097569 A1* | 5/2006 | Eberling | ................... | B60T 8/88 |
| | | | | 303/9.66 |
| 2008/0143179 A1* | 6/2008 | Rutherford | ............... | B60T 7/20 |
| | | | | 303/20 |
| 2008/0177454 A1* | 7/2008 | Bond | .................... | B60T 8/1708 |
| | | | | 701/70 |
| 2009/0204303 A1* | 8/2009 | Leschuk | ................... | B60T 7/12 |
| | | | | 701/71 |
| 2015/0353063 A1* | 12/2015 | Tuhro | ................... | B60T 8/1708 |
| | | | | 701/70 |
| 2018/0079394 A1* | 3/2018 | Cekola | ................. | B60T 8/1708 |
| 2023/0009316 A1* | 1/2023 | Kirmaier | ................... | B60T 7/20 |
| 2024/0101082 A1* | 3/2024 | Yilmaz | ................... | B60T 8/171 |

FOREIGN PATENT DOCUMENTS

| | | |
|---|---|---|
| DE | 102015013461 A1 | 4/2016 |
| DE | 102015112363 A1 | 2/2017 |
| DE | 102021201372 A1 | 8/2022 |
| DE | 102021208620 A1 | 2/2023 |

* cited by examiner

*Primary Examiner* — Logan M Kraft
*Assistant Examiner* — Johnny H Hoang
(74) *Attorney, Agent, or Firm* — Ingrassia Fisher & Lorenz, LLP | IF&L

(57) ABSTRACT

Methods and systems are provided for evaluating trailer braking system performance and conditions. In an exemplary embodiment, a system is provided that includes one or more sensors and a processor. The one or more sensors are configured to obtain sensor data as to a trailer braking system of a trailer that is coupled to a vehicle. The processor is coupled to the one or more sensors, and is configured to at least facilitate determining a condition of the trailer braking system using the sensor data.

20 Claims, 4 Drawing Sheets

METHODS AND SYSTEMS FOR EVALUATING TRAILER BRAKING SYSTEM PERFORMANCE AND CONDITIONS

INTRODUCTION

The technical field generally relates to vehicles and, more specifically, to methods and systems for evaluating a braking system of a trailer that is coupled to a vehicle.

Certain vehicles today include functionality for towing a trailer that is coupled to the vehicle. Certain trailers have their own braking systems. However, existing systems may not always optimally evaluate vehicles may not always optimally evaluate performance and conditions of the trailer braking system.

Accordingly, it is desirable to provide improved methods and systems for evaluating performance and conditions of trailer braking systems. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes obtaining, via one or more sensors, sensor data as to a trailer braking system of a trailer that is coupled to a vehicle; and determining, via a processor, a condition of the trailer braking system using the sensor data.

Also in an exemplary embodiment, the method further includes obtaining, via one or more sensors, sensor data as to a trailer braking system of a trailer that is coupled to a vehicle; and determining, via a processor, a condition of the trailer braking system using the sensor data.

Also in an exemplary embodiment, the step of obtaining the sensor data includes obtaining the sensor data that includes an electric current, a voltage, or both, of the trailer braking system; and the condition of the trailer braking system is determined based on the electric current, the voltage, or both.

Also in an exemplary embodiment, the step of obtaining the sensor data includes determining an electric current of the trailer braking system along with a trailer braking force of the trailer braking system; and the condition of the trailer braking system is determined based on both the electric current and the trailer braking force.

Also in an exemplary embodiment, the condition of the trailer braking system is determined, using the sensor data, by determining a trailer braking intensity index using a vehicle speed, a trailer mass, and estimated trailer braking force; determining a trailer braking force-current coefficient based on a trailer braking current and an aggregation of a total resistance force for the trailer and vehicle combined, a total braking force for the trailer and vehicle combined, and a vehicle braking force for the vehicle alone; determining an end of life force-current coefficient using a trailer profile for the trailer; obtaining weather-related parameters; and determining the condition of the trailer braking system using the trailer braking intensity index, the trailer braking force-current coefficient, the end of life force-current coefficient, the vehicle speed, and the weather-related parameters.

Also in an exemplary embodiment, the total resistance force is determined based on a vehicle acceleration, the vehicle speed, and an axle torque.

Also in an exemplary embodiment, the total braking force is determined based on the vehicle acceleration and a total mass of the vehicle that is estimated based on the vehicle acceleration and the axle torque.

Also in an exemplary embodiment, the vehicle braking force is determined based on a vehicle brake pressure, along with the vehicle acceleration, the vehicle speed, and a calculated values of a vehicle braking force coefficient.

Also in an exemplary embodiment, the method further includes providing a notification as to the condition of the trailer braking system, in accordance with instructions provided by the processor.

Also in an exemplary embodiment, the notification is provided with one or more causes for degradation of the trailer braking system, and wherein the cause are selected from among the following: (a) and end of life condition; (b) an overheating condition; (c) a wet condition; and (d) an unknown condition.

In another exemplary embodiment, a system is provided that includes one or more sensors and a processor. The one or more sensors are configured to obtain sensor data as to a trailer braking system of a trailer that is coupled to a vehicle. The processor is coupled to the one or more sensors, and is configured to at least facilitate determining a condition of the trailer braking system using the sensor data.

Also in an exemplary embodiment, the one or more sensors are configured to obtain the sensor data that includes an electric current, a voltage, or both, of the trailer braking system; and the processor is configured to determine the condition of the trailer braking system based on the electric current, the voltage, or both.

Also in an exemplary embodiment, the one or more sensors are configured to obtain an electric current of the trailer braking system along with a trailer braking force of the trailer braking system; and the processor is configured to determine the condition of the trailer braking system based on both the electric current and the trailer braking force.

Also in an exemplary embodiment, the processor is configured to determine the condition of the trailer braking system, using the sensor data, by determining a trailer braking intensity index using a vehicle speed, a trailer mass, and estimated trailer braking force; determining a trailer braking force-current coefficient based on a trailer braking current and an aggregation of a total resistance force for the trailer and vehicle combined, a total braking force for the trailer and vehicle combined, and a vehicle braking force for the vehicle alone; determining an end of life force-current coefficient using a trailer profile for the trailer; obtaining weather-related parameters; and determining the condition of the trailer braking system using the trailer braking intensity index, the trailer braking force-current coefficient, the end of life force-current coefficient, the vehicle speed, and the weather-related parameters.

Also in an exemplary embodiment, the processor is configured to determine the total resistance force based on a vehicle acceleration, the vehicle speed, and an axle torque.

Also in an exemplary embodiment, the processor is configured to determine the total braking force based on the vehicle acceleration and a total mass of the vehicle that is estimated by the processor based on the vehicle acceleration and the axle torque.

Also in an exemplary embodiment, the processor is configured to determine the vehicle braking force based on a vehicle brake pressure, along with the vehicle acceleration, the vehicle speed, and a calculated values of a vehicle braking force coefficient.

Also in an exemplary embodiment, the processor is further configured to at least facilitate providing a notification as to the condition of the trailer braking system, in accordance with instructions provided by the processor.

Also in an exemplary embodiment, the processor is configured to at least facilitate providing the notification with one or more causes for degradation of the trailer braking system, and wherein the cause are selected from among the following: (a) and end of life condition; (b) an overheating condition; (c) a wet condition; and (d) an unknown condition.

In another exemplary embodiment, a vehicle is provided that includes one or more sensors, a processor, and a display system. The one or more sensors are configured to obtain sensor data as to a trailer braking system of a trailer that is coupled to the vehicle. The processor is coupled to the one or more sensors, and is configured to at least facilitate determining a condition of the trailer braking system using the sensor data. The display system is configured to at least facilitate providing a display of a notification as to the condition of the trailer braking system, in accordance with instructions provided by the processor.

Also in an exemplary embodiment, the notification includes one or more causes for degradation of the trailer braking system, and wherein the cause are selected from among the following: (a) and end of life condition; (b) an overheating condition; (c) a wet condition; and (d) an unknown condition.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
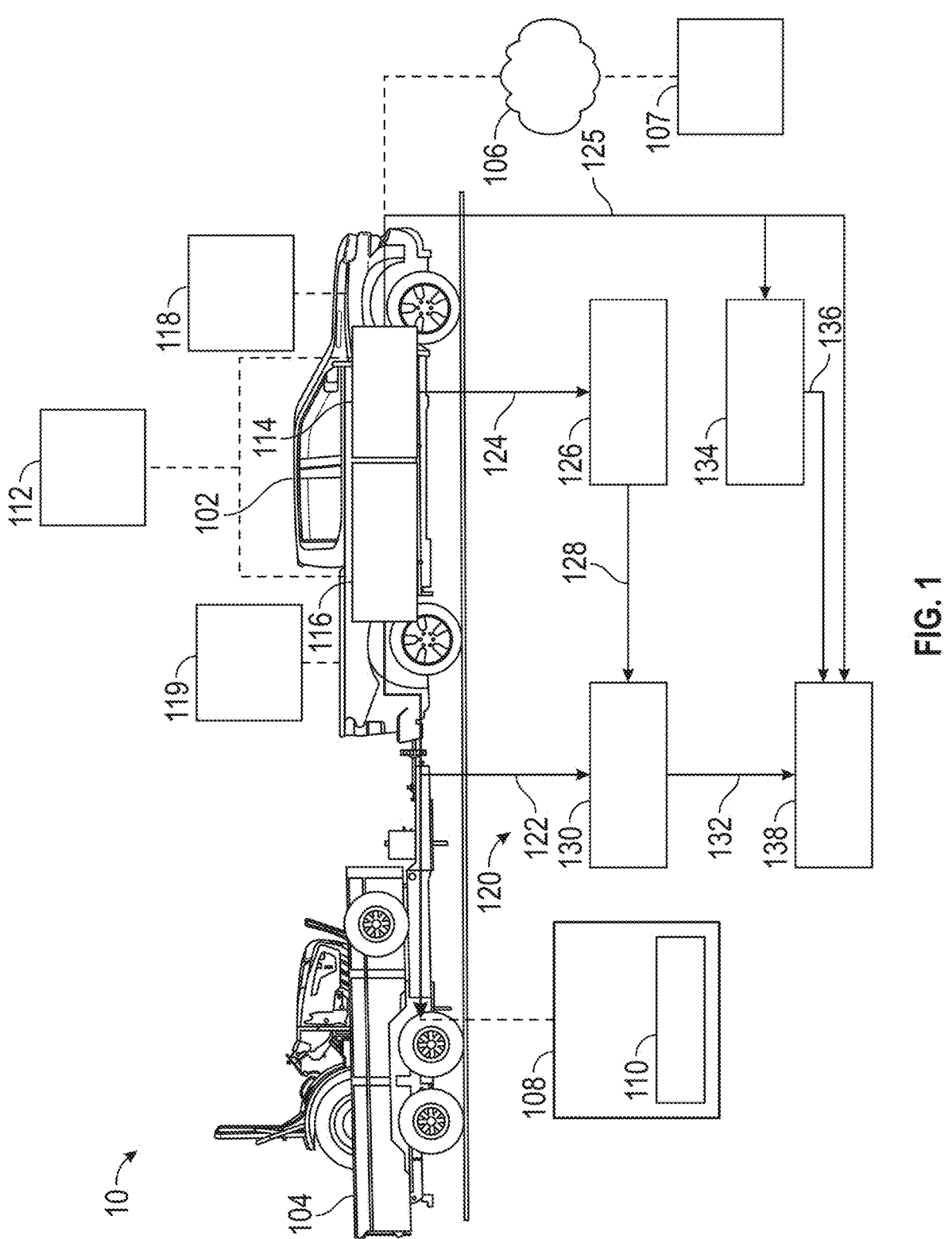
FIG. 1 is a functional block diagram of a system that includes a vehicle that is coupled to a trailer having a trailer braking system, and wherein the vehicle includes a control system for evaluating performance and conditions with respect to the trailer braking system, in accordance with an exemplary embodiment.

FIG. 1 illustrates a system 10 that includes a vehicle 102 and a trailer 104 that is coupled to the vehicle 102, according to an exemplary embodiment. As depicted in FIG. 1, the trailer 104 includes a trailer braking system 108 with brake pads 110. In various embodiments, the trailer braking system 108 comprises an electric braking system. Also as depicted in certain embodiments, the system 10 may also include and/or be implemented in connection with a communications network 106 (e.g., one or more cellular, satellite, and/or other wireless communications systems and/or networks) and one or more third party providers 107 (e.g., providing a weather service and/or other information that may be used by the vehicle 102 and/or the trailer 104).

As described in greater detail further below, in various embodiments, the vehicle 102 includes a control system 112 that is configured for evaluating performance and conditions with respect to the trailer braking system 108, in accordance with an exemplary embodiment. Specifically, as explained in greater detail further below in connection with the process 120 as described below in connection with FIG. 1 as well as in FIGS. 3-4, the control system 112 utilizes measured values of electric current (or, in certain embodiments, voltage) for the trailer braking system 108, in combination with other parameters, in order to evaluate performance of the trailer braking system 108 as well as conditions of the trailer braking system 108 (including an end of life condition and further including when the brake pads 110 are wet).

In various embodiments, the vehicle 102 includes an automobile. The vehicle 102 may be any one of a number of different types of automobiles, such as, for example, a sedan, a wagon, a truck, or a sport utility vehicle (SUV), and may be two-wheel drive (2 WD) (i.e., rear-wheel drive or front-wheel drive), four-wheel drive (4 WD) or all-wheel drive (AWD), and/or various other types of vehicles in certain embodiments. In certain embodiments, the vehicle 102 may also comprise a motorcycle or other vehicle, such as aircraft, spacecraft, watercraft, and so on, and/or one or more other types of mobile platforms (e.g., a robot and/or other mobile platform).

Also in various embodiments, the trailer 104 may comprise any number of different types of trailers and/or other types of mobile platforms, for example that are coupled to the vehicle 102 and move along with the vehicle 102.

As depicted in FIG. 1, the vehicle 102 further includes, in addition to the above-referenced control system 112, a drive system 118 and a vehicle braking system 119. In various embodiments, A drive system 118 is mounted on a chassis (not depicted), and drives the wheels, for example via axles (not depicted in FIG. 1). In various embodiments, the drive system 118 comprises one or more engines and/or motors, coupled with a transmission thereof. In various embodiments, 6

As depicted in FIG. 1, the vehicle also includes a braking system 119 (also referred to herein as a vehicle braking system). In exemplary embodiments, the braking system 119 controls braking of the vehicle 102 using braking components that are controlled via inputs provided by a driver, such as a brake pedal. In various embodiments, the driver inputs are utilized in controlling both the vehicle braking system 119 and the trailer braking system 108 (in various embodiments, in accordance with instructions provided by the control system 112).

In the embodiment depicted in FIG. 1, the control system 112 is coupled to the vehicle braking system 119 and the drive system 118, as well as to the trailer braking system 108, and controls and monitors operation thereof in various embodiments. In various embodiments, the control system 112 may also be coupled to one or more other systems and/or components of the vehicle 102 and/or the trailer 104. Further, as noted above, in various embodiments, the control system 112 is configured for evaluating performance and conditions with respect to the trailer braking system 108, including as described further below in connection with the process 120.

As depicted in FIG. 1, in various embodiments the control system 112 includes, among other components, a sensor array 114 and a controller 116, as will be described in greater detail below.

Figure 2:
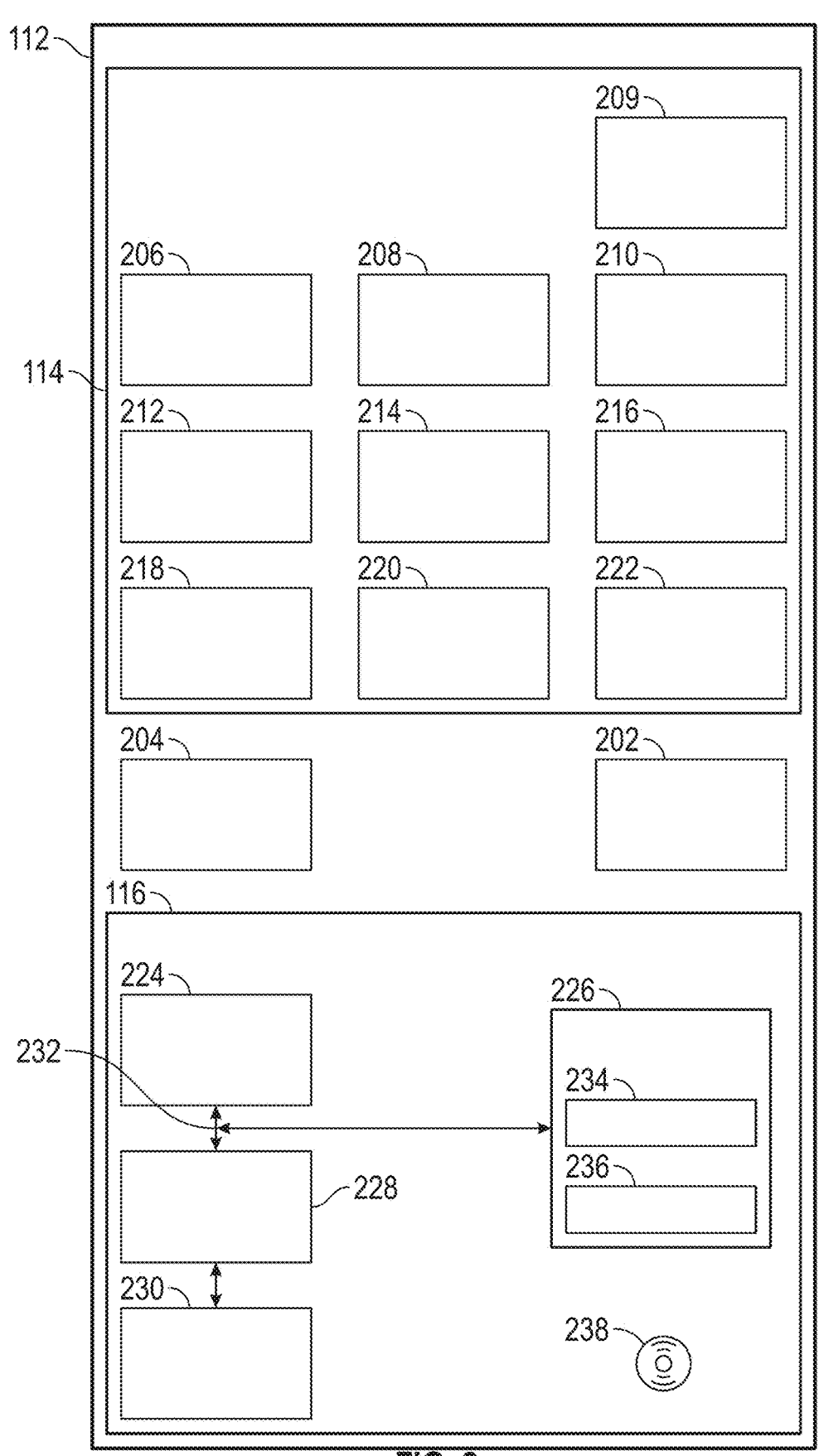
FIG. 2 is functional block diagram of the control system of the vehicle of FIG. 1, in accordance with an exemplary embodiment.

With reference now to FIG. 2, a functional block diagram of a more detailed illustration of the control system 112 is provided. As depicted in FIG. 2, in various embodiments, the control system 112 includes a transceiver 202 and a display system 204, in addition to the sensor array 114 and controller 116 noted above.

In various embodiments, the transceiver 202 is configured to communicate via the communications network 106 of FIG. 1 via one or more third party service providers 107 of FIG. 1. In certain embodiments, the transceiver 202 receives weather information (e.g., as to temperature, precipitation, and so on) form the third party service providers 107 with respect to one or more geographic locations in which the vehicle 102 and trailer 104 are currently located and/or operated and/or were recently located and/or operated.

In various embodiments, the display system 204 provides for a display of a notification of a condition of the trailer braking system 108. In certain embodiments, the display system 204 includes a display screen for visually presenting the notification. In certain embodiments, the display system 204 may also include audio, haptic, and/or other components.

As depicted in FIG. 2, the sensor array 114 includes, in various embodiments, some or all of the following: one or more current sensors 206, voltage sensors 208, speed sensors 210, accelerometers 212, brake pressure sensors 214, wiper sensors 216, temperature sensors 218, and rain sensors 220, among potentially other sensors 222.

In various embodiments, the current sensors 206 measure an electric current that is provided as an input for the trailer braking system 108 of FIG. 1. In certain embodiments, one or more voltage sensors 208 may be used to similarly measure a voltage that is provided as an input for the trailer braking system 108, instead of or in addition to the current as measured via the one or more current sensors 206.

In various embodiments, the speed sensors 210 measure a speed of the vehicle 102. In certain embodiments, this would also correspond to the speed of the trailer 104 as it is hitched to the vehicle 102. In addition, in certain embodiments, the speed sensors 210 comprise one or more wheel speed sensors; however, this may vary in other embodiments.

Also in various embodiments, the accelerometers 212 measure an acceleration (or deceleration) of the vehicle 102 (which in various embodiments is also equal to the acceleration of the trailer 104 when hitched to the vehicle 102).

In various embodiments, the brake pressure sensors 214 measure a brake pressure of the trailer braking system 108.

Also in various embodiments, the wiper sensors 216 sense whether windshield wipers of the vehicle 102 are operating and/or have been activated (e.g., comprising wiper activation sensors in certain embodiments).

In addition, in certain embodiments, the temperature sensors 218 measure an ambient temperature of an environment immediately surrounding the vehicle 102. Also in various embodiments, the rain sensors 220 determine information as to whether it is currently raining in proximity to the vehicle 102. Also in various embodiments, the one or more other sensors 222 may include one or more other types of weather sensors (and/or moisture sensors), among other possible sensors. In addition, in certain embodiments, weather information may also be obtained via one or more other sources, such as one or more third party service providers 107 of FIG. 1 (e.g., a weather service).

In various embodiments, the controller 116 receives sensor data from the sensor array 114 (and in certain embodiments other data form the service providers 107 of FIG. 1), processes the sensor data (and, in certain embodiments, the other data), and evaluates the trailer braking system 108 performance and conditions pertaining thereto, such as is described further below in connection with the process 120. In addition, in certain embodiments, the controller 116 may also control operation of various components of the vehicle 102 and/or the trailer 104, such as the drive system 118, the vehicle braking system 119, the trailer braking system 108, and so on.

As depicted in FIG. 2, in various embodiments, the controller 116 comprises a computer system (and is also referred to herein as computer system 116), and includes a processor 224, a memory 226, an interface 228, a storage device 230, and a computer bus 232. In various embodiments, the controller (or computer system) 116 monitors a condition of the trailer braking system 108. In addition, in certain embodiments, the controller 116 also controls one or more aspects of vehicle 102 and/or trailer 104 operation, including braking for the trailer 104.

In various embodiments, the controller 116 (and, in certain embodiments, the control system 112 itself) is disposed within a body of the vehicle 102. In one embodiment, the control system 112 is mounted on a chassis (not depicted). In certain embodiments, the controller 116 and/or control system 112 and/or one or more components thereof may be disposed outside the body, for example on a remote server, in the cloud, or other device where image processing is performed remotely.

It will be appreciated that the controller 116 may otherwise differ from the embodiment depicted in FIGS. 1 and 2. For example, the controller 116 may be coupled to or may otherwise utilize one or more remote computer systems and/or other control systems, for example as part of one or more of the above-identified vehicle 102 devices and systems.

In the depicted embodiment, the computer system of the controller 116 includes a processor 224, a memory 226, an interface 228, a storage device 230, and a bus 232. The processor 224 performs the computation and control functions of the controller 116, and may comprise any type of processor or multiple processors, single integrated circuits such as a microprocessor, or any suitable number of integrated circuit devices and/or circuit boards working in cooperation to accomplish the functions of a processing unit. During operation, the processor 224 executes one or more programs 234 contained within the memory 226 and, as such, controls the general operation of the controller 116 and the computer system of the controller 116, generally in executing the processes described herein, such as the process 120 described below.

The memory 226 can be any type of suitable memory. For example, the memory 226 may include various types of dynamic random access memory (DRAM) such as SDRAM, the various types of static RAM (SRAM), and the various types of non-volatile memory (PROM, EPROM, and flash). In certain examples, the memory 226 is located on and/or co-located on the same computer chip as the processor 224. In the depicted embodiment, the memory 226 stores the above-referenced program 234 along with one or stored values 236 (e.g., threshold values for the process 120 in certain embodiments).

The bus 232 serves to transmit programs, data, status and other information or signals between the various components of the computer system of the controller 116. The interface 228 allows communication to the computer system of the controller 116, for example from a system driver and/or another computer system, and can be implemented using any suitable method and apparatus. In one embodiment, the interface 228 obtains the various data from the sensor array 114, among other possible data sources. The interface 228 can include one or more network interfaces to communicate with other systems or components. The interface 228 may also include one or more network interfaces to communicate with technicians, and/or one or more storage interfaces to connect to storage apparatuses, such as the storage device 230.

The storage device 230 can be any suitable type of storage apparatus, including various different types of direct access storage and/or other memory devices. In one exemplary embodiment, the storage device 230 comprises a program product from which memory 226 can receive a program 234 that executes one or more embodiments of one or more processes of the present disclosure, such as the steps of the process 120 described below. In another exemplary embodiment, the program product may be directly stored in and/or otherwise accessed by the memory 226 and/or a disk (e.g., disk 238), such as that referenced below.

The bus 232 can be any suitable physical or logical means of connecting computer systems and components. This includes, but is not limited to, direct hard-wired connections, fiber optics, infrared and wireless bus technologies. During operation, the program 234 is stored in the memory 226 and executed by the processor 224.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 224) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 116 may also otherwise differ from the embodiment depicted in FIG. 2, for example in that the computer system of the controller 116 may be coupled to or may otherwise utilize one or more remote computer systems and/or other control systems.

Figure 3:
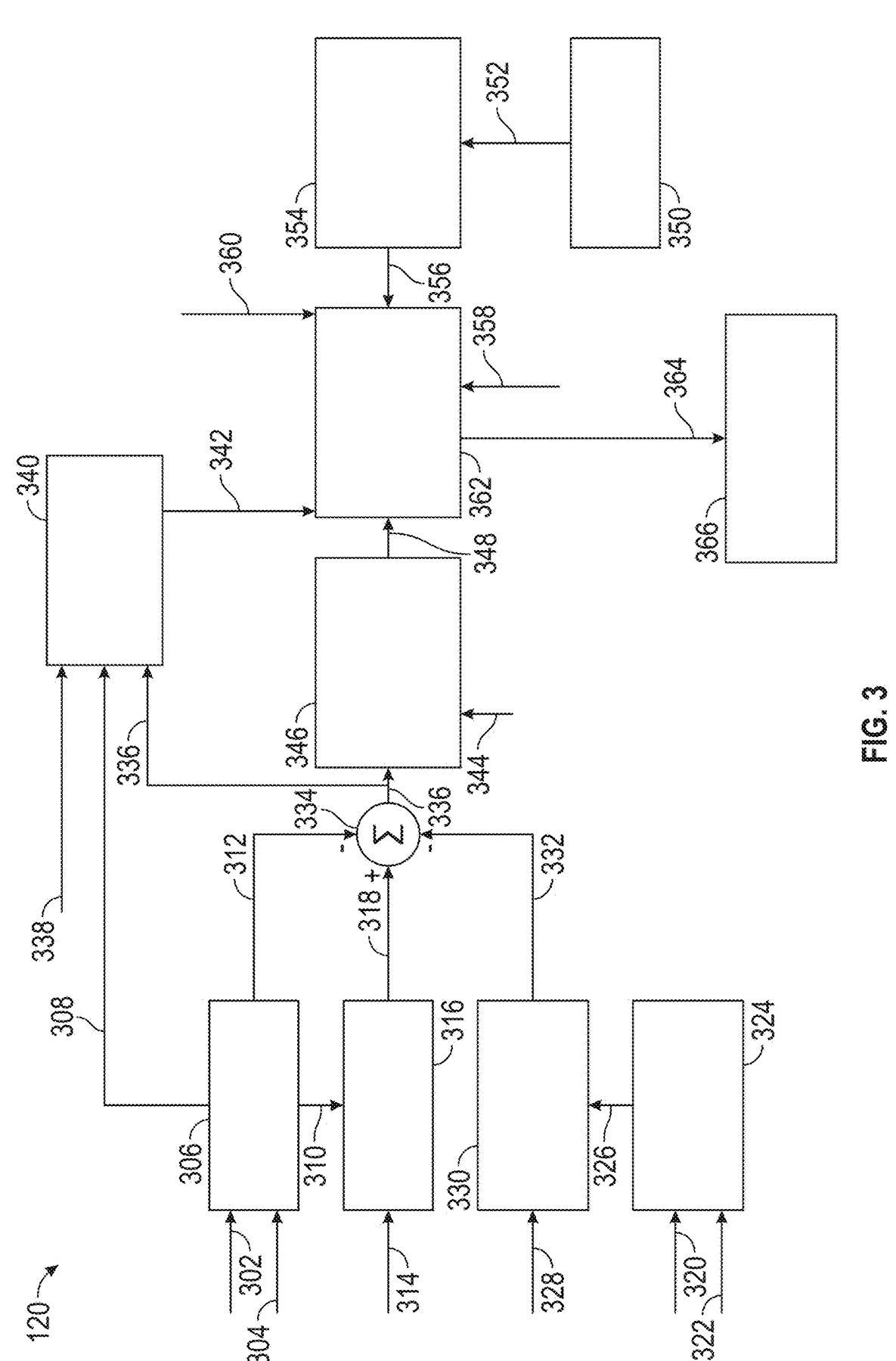
FIG. 3 is a flowchart of process for evaluating performance and conditions with respect to a trailer braking system of a trailer that is coupled to a vehicle, and that can be implemented in connection with the system of FIG. 1, including the vehicle, control system, and trailer of FIG. 1, in accordance with an exemplary embodiment.
Figure 4:
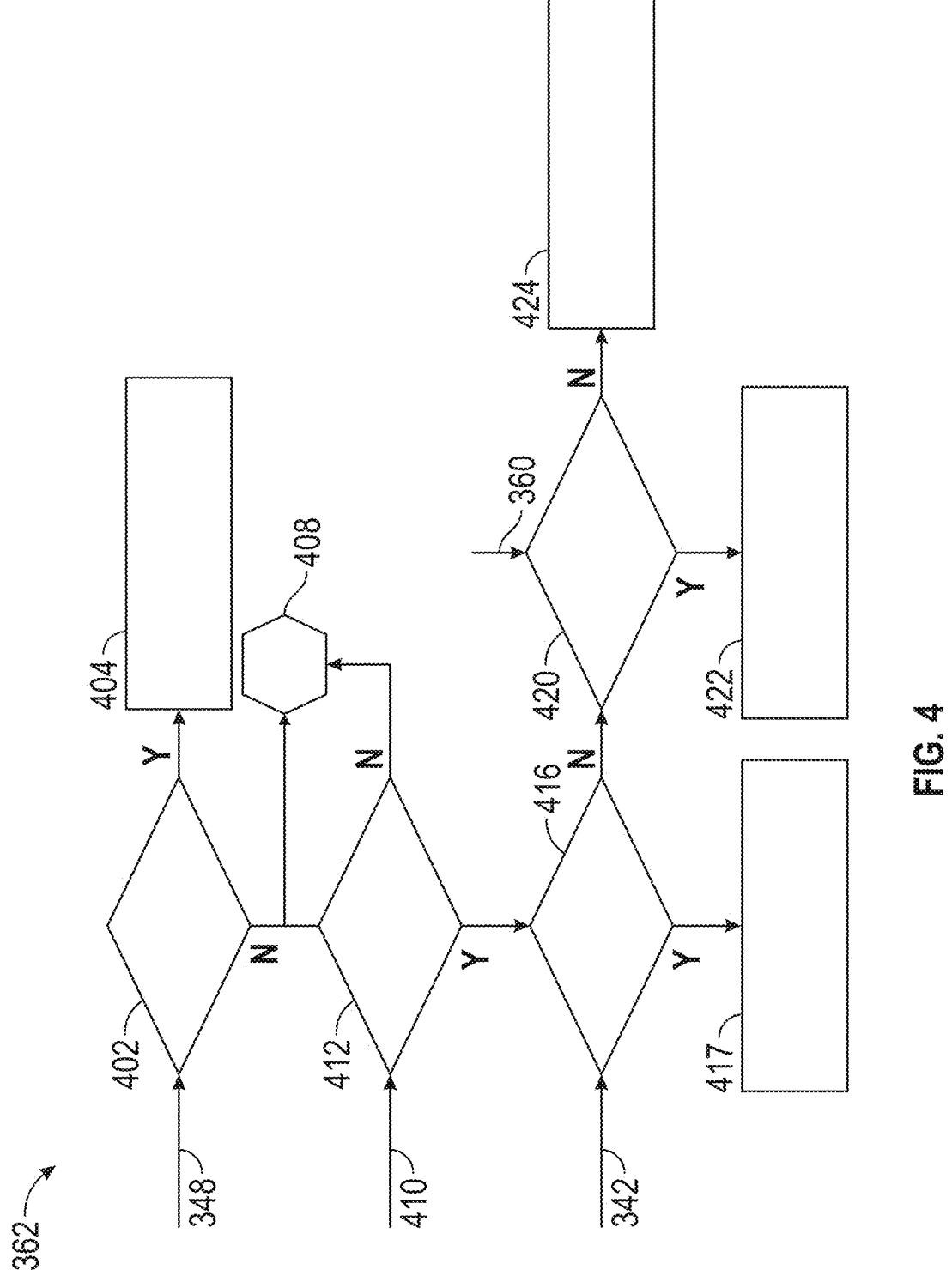
FIG. 4 is a flowchart of an exemplary step of the process of FIG. 3, namely the step of applying trailer brake status identification logic, in accordance with an exemplary embodiment.

With reference back to FIG. 1, in various embodiments, the system 10 is configured to implement the above-referenced process 120, which is depicted at a high level in FIG. 1 and in greater detail in FIGS. 3 and 4. As depicted in FIG. 1, in various embodiments, trailer brake input current (or in certain embodiments voltage) is obtained at step 122. In addition, in various embodiments, other parameter values (e.g., deceleration, speed, and brake pressure) are obtained at step 124. Further, also in various embodiments, weather-related parameters (e.g., wiper activation status, along with temperature, precipitation status, and/or other weather related parameters) are obtained at step 125. In various embodiments, trailer braking force is estimated at step 126, using the parameter values of step 124. Also in various embodiments, the resulting estimated trailer braking force 128 is utilized, along with the trailer brake input current of step 122, is used at step 130 for trailer braking input/output analysis with respect to force versus current (or, in certain embodiments, voltage), resulting in a force-current coefficient. In various embodiments, the weather-related parameters of step 125 are utilized to calculate a trailer braking intensity index at step 134, resulting in a calculated braking intensity 136. Also in various embodiments, the force-current coefficient 132 is utilized at step 138, along with the braking intensity 136 and the weather-related parameters of step 125, to generate a warning strategy FIGS. 3-4 provide a flowchart of the process 120 of FIG. 1 in greater detail.

As depicted in FIG. 3, in various embodiments values are measured as to vehicle acceleration ($a_x$) and vehicle speed (V) (step 302) also well as axle torque (Ta) for the vehicle 102 (step 304). In various embodiments, these values are obtained via respective sensors of the sensor array 114 of FIG. 2, such as one or more accelerometers 212, speed sensors 210, and torque sensors 209. In various embodiments, these values are used to calculate estimated values of mass and resistance force for the combination of the vehicle 102 and trailer 104 (step 306). In various embodiments, these calculations are made via one or more processors, such as the processor 224 of FIG. 2. Also in various embodiments, the calculations of step 306 result in a calculated trailer mass ($m_t$) 308, total mass ($m_t+m_v$) 310, and total resistance force ($F_{RT}$) 312.

Also in various embodiments, values are measured as to vehicle deceleration ($a_x$) (step 314) (e.g., from one or more accelerometers 212 of FIG. 2). In various embodiments, the vehicle deceleration ($a_x$) of step 314 is used along with the total mass ($m_t+m_v$) 310 to generate a total braking force estimation (step 316). In various embodiments, this is performed via the processor 224 of FIG. 1 in accordance with the following equation:

$$F_b = -(m_t + m_v) * a_x. \qquad \text{(Equation 1)}$$

Also in various embodiments, the calculation of step 316 results in a calculated total braking force ($F_b$) 318. In various embodiments, this comprises a combined total braking force for the vehicle 102 and the trailer 104.

In addition, in various embodiments, values are again obtained as to as to vehicle acceleration ($a_x$) and vehicle speed (V) (step 320) also well as vehicle brake pressure ($P_b$) (step 322), and are utilized in calculating an estimated braking force coefficient (step 324). In various embodiments, the processor 224 performs these calculations in step 324 when the trailer 104 is not attached to the vehicle 102, resulting in the vehicle braking force coefficient (K) 326.

Also in various embodiments, the vehicle braking pressure ($P_b$) is again obtained in step 328, and is used along with the vehicle braking coefficient (K) 326 for estimating a vehicle braking force (step 330). In various embodiments, the processor 224 performs these calculations when the trailer 104 is attached to the vehicle 102, in accordance with the following equation:

$$F_{bv} = K * P_b. \qquad \text{(Equation 2)}$$

In various embodiments, the calculations result in the estimated vehicle braking force ($F_{bv}$) 332, as shown in FIG. 3.

Also in various embodiments, the total resistance force ($F_{RT}$) 312, the total braking force ($F_b$) 318, and the vehicle braking force ($F_{bv}$) 332 are summed together (step 334), thereby resulting in a calculated estimated trailer braking force ($F_{bt}$) 336. In various embodiments, this is performed by the processor 224.

In various embodiments, the vehicle speed (V) is again obtained (step 338), and is used along with the trailer mass ($m_t$) 308 and the estimated trailer braking forced ($F_{bt}$) 336 in calculated a trailer braking intensity index (step 340). In various embodiments, during step 340, the processor 224 calculates the trailer braking intensity index ($B_t$) 342 based on both the trailer braking energy and the trailer mass (in certain embodiments, by dividing the trailer braking energy by the trailer mass). In certain embodiments, during step 340, the trailer braking intensity index ($B_t$) 342 is calculated in accordance with the following equation;

$$B_I = \frac{\int_{t-T}^{t} F_b V dt}{m_t}. \qquad \text{(Equation 3)}$$

Also in various embodiments, the trailer braking current (i) is measured or obtained (step 344) (e.g., from one or more current sensors 206 of FIG. 2), and is used along with the estimated trailer braking force ($F_{bt}$) 336 for calculating an estimated trailer braking force—current coefficient ($K_t$) (step 346). In various embodiments, during step 346, the processor 224 calculates the trailer braking force—current coefficient ($K_t$) 348 in accordance with the following equation:

$$K_t = \frac{F_{bt}}{i^2}. \qquad \text{(Equation 4)}$$

In addition, in various embodiments, a trailer profile is obtained (step 350). In various embodiments, the trailer profile is retrieved from computer memory (such as from the memory 226 as stored values 236 therefrom). In various embodiments, the resulting trailer profile 352 includes information as to the trailer 104, including the type of trailer, the number of axles, and a gross vehicle weight (GVW) thereof.

Also in various embodiments, the trailer profile 352 is utilized in calculating an end of life force-current coefficient (step 354). In various embodiments, the processor 224 calculates this coefficient, referred to herein as the end of life force-current coefficient ($K_{end}$) 352.

In various embodiments, the vehicle speed is again obtained (step 358), and various weather related parameters are obtained (step 360). In various embodiments, the weather related parameters including a wiper activation status, a rain sensor status, an ambient temperature, and a weather status (e.g., including any precipitation and/or other weather conditions), among other possible parameters. In various embodiments, the weather related parameters are obtained via respective sensors of the sensor array 114 and/or from one or more service providers 107 (e.g., a weather service, as depicted in FIG. 1).

In various embodiments, the vehicle speed of step 358 is utilized, along with the weather-related parameters of step 360, the trailer braking intensity index ($B_t$) 342, and the trailer braking force-current coefficient ($K_t$) 348, in applying trailer braking status identification logic (step 362). Specifically, in various embodiments, the trailer braking status identification logic is utilized in determining a status 364 of the trailer braking system 108 of FIG. 1. In various embodiments, the status comprises one of the following, among other possible statuses: (i) normal conditions; (ii) wet conditions; (iii) overheated conditions; (iv) an end-of-life situation (e.g., in which the brake pads 110 are near the end of their useful life and need to be replaced); and (v) degradation of the trailer braking system 108 with an unknown cause.

In various embodiments, a notification is provided as to the trailer brake status 364 (step 366). In various embodiments, the notification comprises an identification of the trailer brake status 364, along with any accompanying warnings and/or strategies (e.g., such as replacing the brake pads 110, and so on). In various embodiments, the notification of step 366 is provided via the display system 204 of the vehicle 102, in accordance with instructions provided by the processor 224. In certain embodiments, the notification is provided on a visual display screen of the display system 204. In certain embodiments, the notification may also be provided (e.g., via the transceiver 202) as a message to a smart phone or other personal electronic device of the driver or other user of the vehicle 102 and trailer 104. In certain embodiments, one or more audio, haptic, and/or other notifications may also be provided.

With reference to FIG. 4, a flowchart is provided for step 362 of FIG. 3 (i.e., the application of the trailer braking status identification logic), in accordance with an exemplary embodiment.

In various embodiments, the trailer braking force coefficient $K_t$ 348 is utilized in determining whether the trailer braking coefficient is less than the end of life force-current coefficient (Kend) 356 for at least a predetermined amount of time (e.g., a predetermined amount of days) (step 402). If this is determined to be true (i.e., "yes") in step 402, then an end of life warning is provided (step 404). In various embodiments, the end of life warning is utilized as part of the notification of step 366, and provides a notification that the brake pads 110 of FIG. 1 may be near their useful life (and therefore recommended to be inspected for potential replacement in various embodiments).

Conversely, in various embodiments, if the determination of step 402 is deemed to be false (i.e., "no"), then the process instead waits for a notification (step 408), for example until determinations are made. Also in various embodiments, in this scenario, a trailer braking force-coefficient rate is calculated as a rate of change of the trailer braking force-current coefficient (Kt) 348 over time (step 410). In various embodiments, is calculation is made by the processor 224, and the resulting rate of change can be represented by $\Delta K_t / \Delta_t$.

In various embodiments, a determination is made during step 412 as to whether the rate of change of the trailer braking force-current coefficient ($\Delta K_t / \Delta_t$) has decreased significantly (i.e., greater than a predetermined rate of change threshold) in less than a determined amount of time (e.g., a time threshold, for example represented in minutes or seconds). In various embodiments, if this is determined to be true (i.e., "yes") in step 412, then the process proceeds to step 416, described below. Otherwise, in certain embodiments, the process waits (for example, as noted above for step 408).

In various embodiments, during step 416, a determination is made as to whether the trailer braking intensity index ($B_1$) 342 is greater than a predetermined threshold (step 416). Specifically, in certain embodiments, the processor 224 determines whether the trailer braking intensity index ($B_1$) 342 is greater than a predetermined threshold (e.g., as stored in the memory 226 as a stored value 236 thereof). If this is determined to be true (i.e., "yes") in step 416, then an overheating warning is provided (step 417). In various embodiments, the overheating warning is utilized as part of the notification of step 366, and provides a notification that the trailer braking system 108 may be overheating (and therefore an appropriate warning and recommendation is provided to allow the trailer braking system 108 to cool).

Conversely, in various embodiments, if the determination of step 416 is deemed to be false (i.e., "no"), then the process proceeds to step 420. In various embodiments, during step 420, the weather-related parameters 360 (i.e., from FIG. 3) are utilized in determining whether precipitation is occurring (e.g., rain, sleet, snow, or the like). In various embodiments, this determination is made by the processor 224.

In various embodiments, if the determination of precipitation of step 420 is true (i.e., "yes"), then a wet trailer brake warning is provided (step 422). In various embodiments, the wet trailer brake warning is utilized as part of the notification of step 366, and provides a notification that the trailer braking system 108 (and/or the brake pads 110 thereof) may be wet (and therefore an appropriate warning and recommendation is provided accordingly).

Conversely, in various embodiments, if the determination of precipitation of step 420 is false (i.e., "yes"), then a trailer brake degradation warning of unknown source is provided (step 424). In various embodiments, this warning is utilized as part of the notification of step 366, and provides a notification that the trailer braking system 108 is degraded and/or not operating properly, and that the reason for the degradation is unknown (and therefore an appropriate warning and recommendation is provided accordingly, such as for inspection of the trailer braking system 108).

Accordingly, methods, systems, and vehicles are provided for evaluating a braking system of a trailer that is coupled to a vehicle, in accordance with exemplary embodiments. In various embodiments, the methods and systems utilize measured values of electric current (or, in certain embodiments, voltage) for the trailer braking system 108, in combination with other parameters (for example, such as trailer braking force and weather-related parameters), in order to evaluate performance of the trailer braking system 108 as well as conditions of the trailer braking system 108 (including an end of life condition and further including when the brake pads 110 are wet).

It will be appreciated that the systems, vehicles, and methods may vary from those depicted in the Figures and described herein. For example, the system 10 of FIG. 1, including the vehicle 102, the trailer 104, and the control system 112 of FIGS. 1 and 2 and/or components thereof, may vary in different embodiments. It will similarly be appreciated that the steps of the process 120 may differ from those depicted in FIGS. 1, 3, and 4, and/or that various steps of the process 120 may occur concurrently and/or in a different order than that depicted in FIGS. 1, 3, and 4.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining, via one or more sensors, sensor data as to a trailer braking system of a trailer that is coupled to a vehicle;

determining, via a processor, a condition of the trailer braking system using the sensor data, including by:

determining a trailer braking intensity index using a vehicle speed, a trailer mass, and estimated trailer braking force;

determining a trailer braking force-current coefficient based on a trailer braking current and an aggregation of a total resistance force for the trailer and vehicle combined, a total braking force for the trailer and vehicle combined, and a vehicle braking force for the vehicle alone;

determining an end of life force-current coefficient using a trailer profile for the trailer;

obtaining weather-related parameters; and determining the condition of the trailer braking system using the trailer braking intensity index, the trailer braking force-current coefficient, the end of life force-current coefficient, the vehicle speed, and the weather-related parameter; and providing a visual notification, on a visual display screen of a display system inside the vehicle in accordance with instructions provided by the processor to the display system, as to a condition of the trailer braking system, including one or more recommended control actions pertaining thereto.

2. The method of claim 1, wherein:

the step of obtaining the sensor data comprises obtaining the sensor data that comprises an electric current, a voltage, or both, of the trailer braking system; and the condition of the trailer braking system is determined based on the electric current, the voltage, or both.

3. The method of claim 1, wherein:

the step of obtaining the sensor data comprises determining an electric current of the trailer braking system along with a trailer braking force of the trailer braking system; and the condition of the trailer braking system is determined based on both the electric current and the trailer braking force.

4. The method of claim 1, wherein the total resistance force is determined based on a vehicle acceleration, the vehicle speed, and an axle torque.

5. The method of claim 4, wherein the total braking force is determined based on the vehicle acceleration and a total mass of the vehicle that is estimated based on the vehicle acceleration and the axle torque.

6. The method of claim 5, wherein the vehicle braking force is determined based on a vehicle brake pressure, along with the vehicle acceleration, the vehicle speed, and a calculated values of a vehicle braking force coefficient.

7. The method of claim 1, wherein the notification is provided with one or more causes for degradation of the trailer braking system, and wherein the cause are selected from among the following: (a) and end of life condition; (b) an overheating condition; (c) a wet condition; and (d) an unknown condition.

8. A system comprising:
one or more sensors configured to obtain sensor data as to a trailer braking system of a trailer that is coupled to a vehicle; and
a processor that is coupled to the one or more sensors and that is configured to at least facilitate:
determining a condition of the trailer braking system using the sensor data, including by:
determining a trailer braking intensity index using a vehicle speed, a trailer mass, and estimated trailer braking force;
determining a trailer braking force-current coefficient based on a trailer braking current and an aggregation of a total resistance force for the trailer and vehicle combined, a total braking force for the trailer and vehicle combined, and a vehicle braking force for the vehicle alone;
determining an end of life force-current coefficient using a trailer profile for the trailer;
obtaining weather-related parameters; and
determining the condition of the trailer braking system using the trailer braking intensity index, the trailer braking force-current coefficient, the end of life force-current coefficient, the vehicle speed, and the weather-related parameter; and
providing a visual notification, on a visual display screen of a display system inside the vehicle in accordance with instructions provided by the processor to the display system, as to a condition of the trailer braking system, including one or more recommended control actions pertaining thereto.

9. The system of claim 8, wherein:
the one or more sensors are configured to obtain the sensor data that comprises an electric current, a voltage, or both, of the trailer braking system; and
the processor is configured to determine the condition of the trailer braking system based on the electric current, the voltage, or both.

10. The system of claim 8, wherein:
the one or more sensors are configured to obtain an electric current of the trailer braking system along with a trailer braking force of the trailer braking system; and
the processor is configured to determine the condition of the trailer braking system based on both the electric current and the trailer braking force.

11. The system of claim 10, wherein the processor is configured to determine the total resistance force based on a vehicle acceleration, the vehicle speed, and an axle torque.

12. The system of claim 11, wherein the processor is configured to determine the total braking force based on the vehicle acceleration and a total mass of the vehicle that is estimated by the processor based on the vehicle acceleration and the axle torque.

13. The system of claim 12, wherein the processor is configured to determine the vehicle braking force based on a vehicle brake pressure, along with the vehicle acceleration, the vehicle speed, and a calculated values of a vehicle braking force coefficient.

14. The system of claim 10, wherein the processor is configured to at least facilitate providing the notification with one or more causes for degradation of the trailer braking system, and wherein the cause are selected from among the following: (a) and end of life condition; (b) an overheating condition; (c) a wet condition; and (d) an unknown condition.

15. A vehicle comprising
one or more sensors configured to obtain sensor data as to a trailer braking system of a trailer that is coupled to the vehicle; and
a processor that is coupled to the one or more sensors and that is configured to at least facilitate determining a condition of the trailer braking system using the sensor data, including by:
determining a trailer braking intensity index using a vehicle speed, a trailer mass, and estimated trailer braking force;
determining a trailer braking force-current coefficient based on a trailer braking current and an aggregation of a total resistance force for the trailer and vehicle combined, a total braking force for the trailer and vehicle combined, and a vehicle braking force for the vehicle alone;
determining an end of life force-current coefficient using a trailer profile for the trailer;
obtaining weather-related parameters; and
determining the condition of the trailer braking system using the trailer braking intensity index, the trailer braking force-current coefficient, the end of life force-current coefficient, the vehicle speed, and the weather-related parameter; and
a display system that is configured to at least facilitating a display of a notification as to the condition of the trailer braking system, in accordance with instructions provided by the processor.

16. The vehicle of claim 15, wherein the notification includes one or more causes for degradation of the trailer braking system, and wherein the cause are selected from among the following: (a) and end of life condition; (b) an overheating condition; (c) a wet condition; and (d) an unknown condition.

17. The vehicle of claim 15, wherein:
the one or more sensors are configured to obtain the sensor data that comprises an electric current, a voltage, or both, of the trailer braking system; and
the processor is configured to determine the condition of the trailer braking system based on the electric current, the voltage, or both.

18. The vehicle of claim 17, wherein:
the one or more sensors are configured to obtain an electric current of the trailer braking system along with a trailer braking force of the trailer braking system; and
the processor is configured to determine the condition of the trailer braking system based on both the electric current and the trailer braking force.

19. The vehicle of claim 18, wherein the processor is configured to determine the total resistance force based on a vehicle acceleration, the vehicle speed, and an axle torque.

20. The vehicle of claim 19, wherein the processor is configured to:
determine the total braking force based on the vehicle acceleration and a total mass of the vehicle that is estimated by the processor based on the vehicle acceleration and the axle torque; and determine the vehicle braking force based on a vehicle brake pressure, along with the vehicle acceleration, the vehicle speed, and a calculated values of a vehicle braking force coefficient.

\* \* \* \* \*